United States Patent Office 3,485,159
Patented Dec. 23, 1969

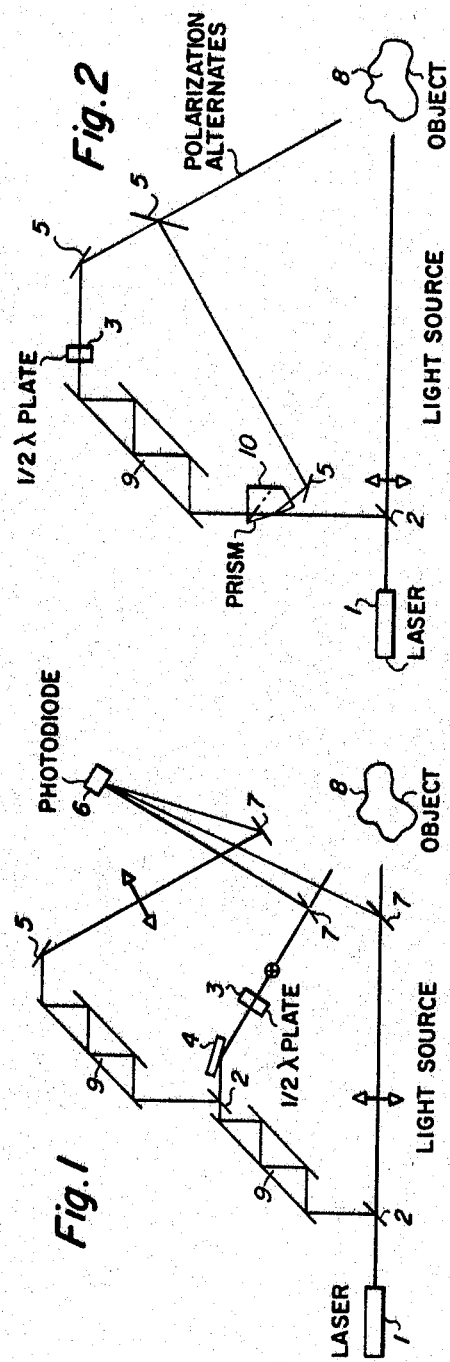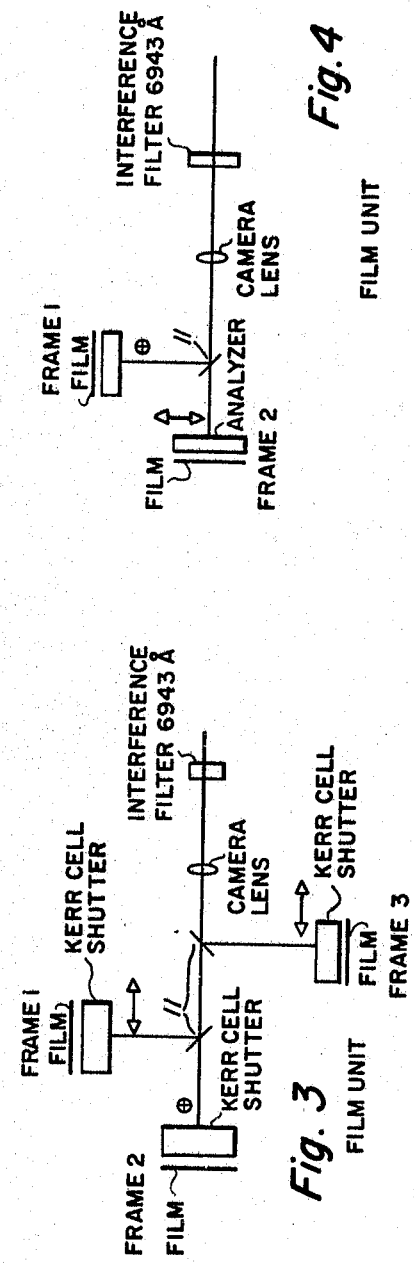

3,485,159
HIGH-SPEED FRAMING CAMERA SYSTEM
Gene H. McCall, Princeton, N.J., assignor to the United States of America as represented by the United States Atomic Energy Commission
Filed June 6, 1967, Ser. No. 644,465
Int. Cl. G03b 19/02
U.S. Cl. 95—36
2 Claims

ABSTRACT OF THE DISCLOSURE

A high-speed framing camera system for photographing an object having no luminosity of its own. A high, dense and short pulse width light is produced by a Q-switched laser. The light is split into multiple beams, one of which is reflected into a delay unit and then through a polarizer that rotates the light by 90 degrees. The several beams of light then impinge on the object after which the reflected light containing the objects' image passes through an interference filter. The light passing through the filter strikes a Kerr cell shutter to expose the film behind each cell.

---

The invention described herein was made in the course of, or under a contract with the U.S. Atomic Energy Commission.

The inventor has discovered that the short pulse width, high density, and spectral purity of a Q-switched ruby laser makes it possible to design a high-speed framing camera system which would be useful in photographing objects which have no luminosity of their own or which are surrounded by an envelope of luminous gas. Specifically, using equipment which is presently available the inventor has designed a camera system which exposes several frames with exposure times as short as 10 nanoseconds and frame separations as short as 5 nanoseconds. To date there has been no convenient or easy method of photographing a solid object which is surrounded by an envelope of hot gas. Prior art camera systems and methods which were used to photograph an object of this type encountered the difficulty that the light emitted by the gas obscured the object. The inventor has discovered that the high intensity of the laser and the interference filter in front of the camera lens makes it possible to photograph an object of this type.

For example, suppose that the object has a reflectivity of 1%, the laser power is 50 megawatts, five frames are to be taken, and the gas temperature is $10^5$K. If the area to be photographed is six inches in diameter, the intensity at the object is 250 kilowatts/cm.$^2$; assuming the bandwidth of the interference filter to be 2 angstroms, the intensity of the light radiated from the gas is 200 watts/cm.$^2$, and the light reflected by the object has an intensity of 2 kilowatts/cm.$^2$. An intensity ratio of ten will make the object visible.

It is therefore an object of this invention to provide a high-speed framing camera system which can photograph objects that have a hot gas envelope surrounding them or no luminosity of their own.

Other objects of this invention will be apparent from the following description when read in connection with the accompanying drawings in which:

FIGURE 1 is a schematic drawing of the light source associated with a three-frame system, the film unit of which is shown in FIGURE 3, and showing the principles involved in the preferred embodiment of this invention.

FIGURE 2 is a schematic drawing showing a variation of the preferred embodiment as shown in FIGURE 1 and consists of a two-frame light source unit.

FIGURE 3 is a schematic drawing of the film unit for a three-frame system as shown in FIGURE 1.

FIGURE 4 is a schematic drawing of a two-frame film unit system which is used in conjunction with the light source system of FIGURE 2.

Light source

The principles involved in the operation of the high intensity light source are shown in FIG. 1. The delay units 9 are shown as plane parallel mirrors, and a separate delay unit 9 is shown for each pulse, but it is possible to reduce the number of delay units 9 by a proper use of beam spliters 2 and mirrors 5. FIGURE 1 illustrates an arrangement for three frames. Light from a Q-switched ruby laser 1 is reflected into the first delay unit 9 by a beam splitter 2 which passes a fraction $1/n$ of light where $n$ is the number of frames to be exposed. The delay between the first exposure and the second exposure is controlled by varying the spacing between the two mirrors which form the delay unit 9, and in the multidelay unit case the frame spacing may be changed from frame to frame. At the output of alternate units 9 there is a half-wave plate 3 which rotates the polarization of the light by 90 degrees; the polarization direction is shown by the arrows on the light beams. This rotation of the polarization allows the separation between frames to be shorter than the pulse duration of the laser pulse as will be described in the section on the operation of the film unit (see FIGURE 3). The beam splitter 2 at the output of the first delay unit transmits a fraction $n/n(n-1)$ of the incident light to the object 8 so that the intensities of all bursts are the same that enters the camera lens and film unit of FIGURE 2 which has been situated in an appropriate position to receive the reflected light. FIGURE 2 shows a method of eliminating all but one of the delay units, but in this case the burst intensities are not equal and the interframe time is the same for all frames; however, the savings in space and components are considerable. In particular, light from laser 1 hits beam splitter 2 which reflects a fraction of said light through prism 10 which in turn reflects a portion of this light by means of mirrors 5 through beam splitter 2 to object 8 and then through the film unit shown schematically in FIGURE 4.

At this point we have a light source which delivers $n$ pulses each of ten nanoseconds duration with an intensity of, typically, $5/n$ megawatts per pulse. The spacing between pulses is arbitrary and adjustable. The arrangement with a single delay unit 9 (FIGURE 2) does not deliver the same power in every pulse, but for small $n$ the difference in powers should not affect the operation of the device. The light source is triggered by triggering the laser Kerr cell with a 200 v. pulse.

Film unit

The film unit is shown schematically in FIG. 3 for a three-frame system (see FIGURE 1), and a two-frame system (FIGURE 2) is shown in FIG. 4. The reduction in components when the number of frames is reduced from three to two results in considerable simplification. Reflected light from the object 8 to be photographed passes through the interference filter (which only passes light whose wavelength is close to that of the ruby laser 1), strikes the beam splitters 11, and a portion of the light falls on each Kerr cell shutter. There are two conditions which must be satisfied before the light will be transmitted through the shutter to the film. First, the shutter must have been opened by de-energizing the Kerr cell at the proper time, and second, the polarization of the light must be such that the polarizers which are used in the Kerr cell shutter will pass it. It is this property of the film unit (as shown in FIGURES 3 and 4) which allows the second frame exposure to begin before the first frame exposure ends; the two beams of light used to expose these two frames are of opposite polarizations so only one beam reaches each photographic plate.

It is important to notice that this camera system does *not* suffer from the time-jitter problems that are found in ordinary Kerr cell cameras. In present Kerr cell cameras the exposure duration and the frame spacing depend on the accurate timing of pulses which open and close the Kerr cell shutters; in this camera system, the timing of the exposure duration is done by the laser beam, and the frame interval is determined by the spacing of the mirrors in the delay unit 9. Thus, it is only necessary to open the Kerr cell at some time before the frame is to begin and to close it before the next frame of the same polarization begins; extreme accuracy of Kerr cell timing is eliminated. Although the times are reproducible, a photodiode 6 and mirrors 7 may be used at the time of exposure to determine intervals as shown in FIG. 1.

Thus, it is apparent that the present invention provides a simple, high-speed framing camera system and method for photographing objects which are surrounded by a hot gas envelope. While the preferred embodiment of the invention has been described, it is clear that modifications may be made without departing from the scope of this invention. Therefore, the present invention is not limited by the foregoing description but solely by the appended claims.

What is claimed is:

1. A high-speed framing camera system for photographing an object surrounded by a luminous gas or having no luminosity of its own comprising the combination of a light source and film unit, said light source having (a) a Q-switched ruby laser that produces a high, dense, short pulse width light, (b) said light being split into multiple beams by a beam splitter, one of said beams being reflected into (c) at least one delay unit, (d) and then through a one-half wavelength plate which rotates the polarization of this beam by 90 degrees, the several beams of light impinging on the object and this reflected light containing the image of the said object is then passed through a film unit containing (e) an interference filter that passes the reflected light at only a wavelength close to that of the said laser, (f) said reflected light impinging upon at least one beam splitter that passes a portion of the light and reflects the remainder upon a Kerr cell that is energized by the appropriate polarized light, (h) and said cell passing the reflected light to a film means positioned behind said cell.

2. A method of photographing an object surrounded by luminous gas or having no luminosity of its own comprising a Q-switched ruby laser that produces a high, dense, short pulse width light as the light source, said light being split into multiple beams and one of said beams being reflected into a delay unit and then through a polarizer that rotates the light by 90 degrees, the several beams of light then impinging on the object and the reflected light containing the image of said object being passed through an interference filter that passes only light at a wavelength closer to that of the said laser and then said passed light impinging upon at least one beam splitter and then upon a Kerr cell energized by a particular polarized light, and finally the film situated behind each cell.

References Cited
UNITED STATES PATENTS

| | | | |
|---|---|---|---|
| 2,961,918 | 11/1960 | Nadig | 95—36 XR |
| 3,143,051 | 8/1964 | Teeple. | |
| 3,181,170 | 4/1965 | Akin | 346—108 |

OTHER REFERENCES

Ellis et al., "Application of a Ruby Laser to High-Speed Photography," Proceedings of the I.E.E.E., June 1963.

Hoffman et al., "Inverted Reference-Beam Hologram," J.O.S.A., November 1965.

Hecht et al., "High-Speed Stroboscopic Photography Using a Kerr-Cell Modulated Laser Source," Instrument Society America Transaction, April 1966

Vienot et al., "Resolution . . . laser par photographie . . . continu," Académe des Science (Paris), February 1963.

JOHN M. HORAN, Primary Examiner

LEO H. McCORMICK, Jr., Assistant Examiner

U.S. Cl. X.R.
352—84